(12) United States Patent
Mistkawi (10) Patent No.: US 11,431,053 B2
(45) Date of Patent: Aug. 30, 2022

(54) BATTERY HOLDER MECHANISM (71) Applicant: DATALOGIC IP TECH S.R.L., Lippo di Calderara di Reno (IT)

(72) Inventor: Joseph Mistkawi, Bologna (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 393 days.

(21) Appl. No.: 16/469,217

(22) PCT Filed: Dec. 13, 2017

(86) PCT No.: PCT/IB2017/057881
§ 371 (c)(1),
(2) Date: Jun. 13, 2019

(87) PCT Pub. No.: WO2018/109683
PCT Pub. Date: Jun. 21, 2018

(65) Prior Publication Data
US 2019/0386265 A1    Dec. 19, 2019

(30) Foreign Application Priority Data
Dec. 13, 2016  (IT) .................. 102016000125359

(51) Int. Cl.
*H01M 12/00*     (2006.01)
*H01M 50/20*     (2021.01)
(Continued)

(52) U.S. Cl.
CPC ......... *H01M 50/20* (2021.01); *H01M 50/572* (2021.01); *H02J 7/0044* (2013.01);
(Continued)

(58) Field of Classification Search
None
See application file for complete search history.

(56) References Cited

U.S. PATENT DOCUMENTS 4,146,682 A     3/1979  Nakao
5,933,330 A *   8/1999  Beutler ............... H04B 1/3883
                                                   361/814
(Continued)

OTHER PUBLICATIONS

Int'l Preliminary Report on Patentability (IPRP), PCT/IB2017/057881, dated Jun. 27, 2019, 10 pages.
(Continued)

*Primary Examiner* — Cynthia H Kelly
*Assistant Examiner* — Julian Anthony
(74) *Attorney, Agent, or Firm* — The Juhasz Law Firm (57) ABSTRACT

The disclosure relates to a portable terminal with a case and inside the case: an electronic or optoelectronic module for acquiring or processing information or data and a compartment for housing a battery pack, said battery pack configured to power said electronic or optoelectronic module. The portable terminal also includes: a cap for closing said compartment, said cap being movable between a closed position and an open position wherein said compartment is open to allow the insertion or extraction of said battery pack. The terminal also includes a locking/unlocking device configured to lock/unlock said cap from said case. The terminal also includes a holding device configured for holding said battery pack within said compartment, wherein said holding device can be deactivated when said cap is in said open position in order to allow said battery pack to be extracted from said compartment.

20 Claims, 6 Drawing Sheets (51) Int. Cl.
  *H01M 50/244* (2021.01)
  *H02J 50/20* (2016.01)
  *H02J 50/40* (2016.01)
  *H02J 7/00* (2006.01)
  *H01M 50/572* (2021.01)

(52) U.S. Cl.
  CPC .............. *H02J 50/20* (2016.02); *H02J 50/40* (2016.02); *H01M 2220/30* (2013.01)

(56) References Cited

U.S. PATENT DOCUMENTS

| | | |
|---|---|---|
| 5,955,700 A | 9/1999 | Slipy et al. |
| 6,051,334 A | 4/2000 | Tsurumaru et al. |
| 6,436,569 B1 | 8/2002 | Dijkstra et al. |
| 6,730,432 B1 | 5/2004 | Grosfeld et al. |
| 9,244,507 B2 | 1/2016 | Chiba |
| 2011/0159337 A1* | 6/2011 | Liang .................. H04M 1/0262 429/100 |
| 2011/0318662 A1 | 12/2011 | Ming-Chun |
| 2016/0276634 A1 | 9/2016 | Kong et al. |

OTHER PUBLICATIONS

Int'l Search Report, PCT/IB2017/057881, dated Apr. 4, 2018, 4 pages.
Written Opinion, PCT/IB2017/057881, dated Apr. 4, 2018, 8 pages.
Digital Scanner Product Reference Guide, Rev. A (MN-002689-12EN), for DS36X8 Digital Scanner, Zebra Techs Dorp, Dec. 2020 (40 pages). See esp. pp. 35-40.
Symbol DS3478 Smart Focus Digital Scanner Product Reference Guide, 72E-72109-05, Rev. A, Motorola Inc., May 2009, (30 pages). See esp. pp. 27-28.

* cited by examiner

BATTERY HOLDER MECHANISM

CLAIM TO PRIORITY

This application claims priority under the terms of 35 U.S.C. § 371(c) to PCT/IB2017/057881, filed on Dec. 13, 2017, which is hereby incorporated by reference in its entirety; PCT application PCT/IB2017/057881 claims priority to Italian Application 102016000125359, filed on Dec. 13, 2016, which is also incorporated by reference in its entirety.

BACKGROUND

Field

This disclosure relates to a portable terminal.

Description

In the rest of the present description and in the following claims, the expression "portable terminal" is used to refer to electronic and/or optoelectronic devices of any type intended to be gripped by a user. Reference is made for example to optical code readers, handheld computers, laptop computers, PDAs, tablet computers, mobile telephones, portable measuring devices and more generally portable devices capable of connecting within wireless networks through a suitable radio frequency transmitting/receiving device, etc.

Preferably, the portable terminal of the invention is a device for the acquisition of optical information.

In the rest of the present description and in the following claims, the expression "acquisition of optical information" is used to indicate the acquisition of information relating to an object (for example distance, volume, bulk, identifying data thereof, or characteristics thereof) through the acquisition and processing of a light signal diffused by the same object. The expression "optical information" is used in the broadest sense and comprises optical codes, but also, more generally, images containing characteristics suitable for identifying and/or selecting an object, for example based on the shape and/or volume thereof.

The expression "optical code" is used to indicate any graphical representation having the function of storing encoded information. A particular example of optical code consists of linear or two-dimensional codes, in which the information is encoded through suitable combinations of elements having a predetermined shape, for example square, rectangular or hexagonal, of dark colour (normally black) separated by light elements (spaces, normally white), such as bar codes, stacked codes and two-dimensional codes in general, colour codes, etc. The expression "optical code" also comprises, more generally, other graphical forms with information encoding function, including characters printed in plain text (letters, numbers, etc.) and particular shapes ("patterns") (like for example stamps, logos, signatures, fingerprints etc.). The expression "optical code" also comprises graphical representations which can be detected not only in the visible light range, but also in the range of wavelengths comprised between infrared and ultraviolet.

For the sake of simplicity of description, hereinafter explicit reference will be made to optical code readers, commonly called scanners. However, the invention can also be applied in different types of devices, such as image sensors (vision sensors, smart cameras) for recognising objects through detection of the shape or size characteristics thereof, and in general for artificial vision applications such as quality control of objects in industrial processes.

Portable terminals of different shapes and sizes are known.

In particular, portable terminals without handle and portable terminals provided with a handle are known.

Portable terminals without handle typically have a substantially parallelepiped or similar body; the user grips the terminal at a lower portion of the body of the terminal. Such terminals are indicated hereinafter as "Handheld terminal".

On the other hand, portable terminals provided with a handle typically have, in addition to a substantially parallelepiped or similar body, a grip (or handle) associated with the aforementioned body so as to define an overall "gun" shape; the user grips the terminal at the aforementioned grip. Such terminals are indicated hereinafter as "Gun terminals".

Portable Handheld and Gun terminals typically comprise a case and, inside the case, an electronic and/or optoelectronic module configured to acquire and/or process information and/or data, for example optical information, and a battery pack configured to power the electronic and/or optoelectronic module.

In the rest of the present description and in the following claims, the expression "battery pack" is used to refer to a battery of any shape and type (alkaline, lithium, etc.) or to a plurality of such batteries, in which the battery(-ies) can be housed in an appropriate cartridge.

Figures 1, 2:
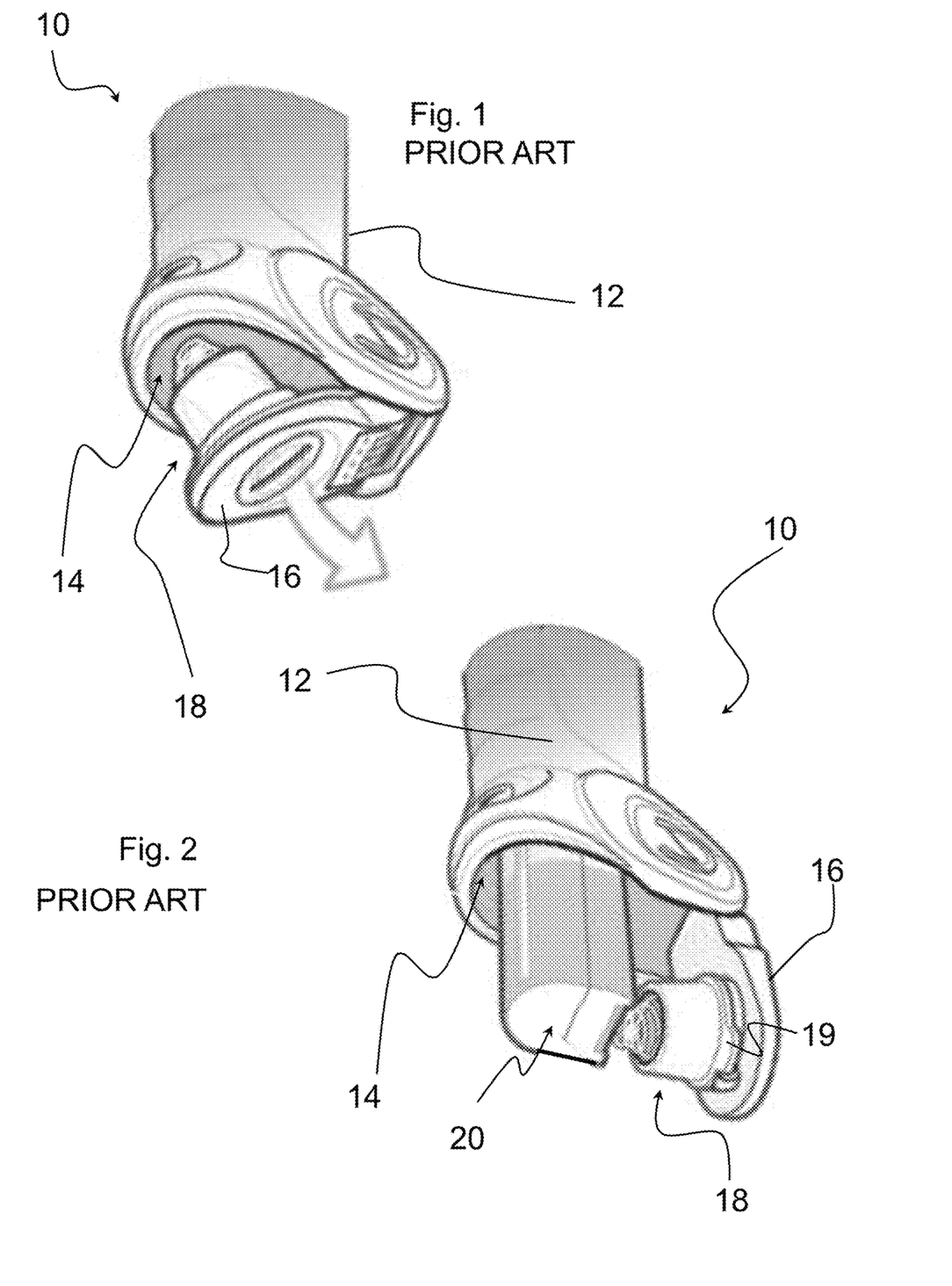
FIGS. 1 and 2 are schematic perspective views of a portion of a portable terminal in accordance with the prior art, wherein the cap of the portable terminal is in two successive opening positions thereof.
Figure 3:
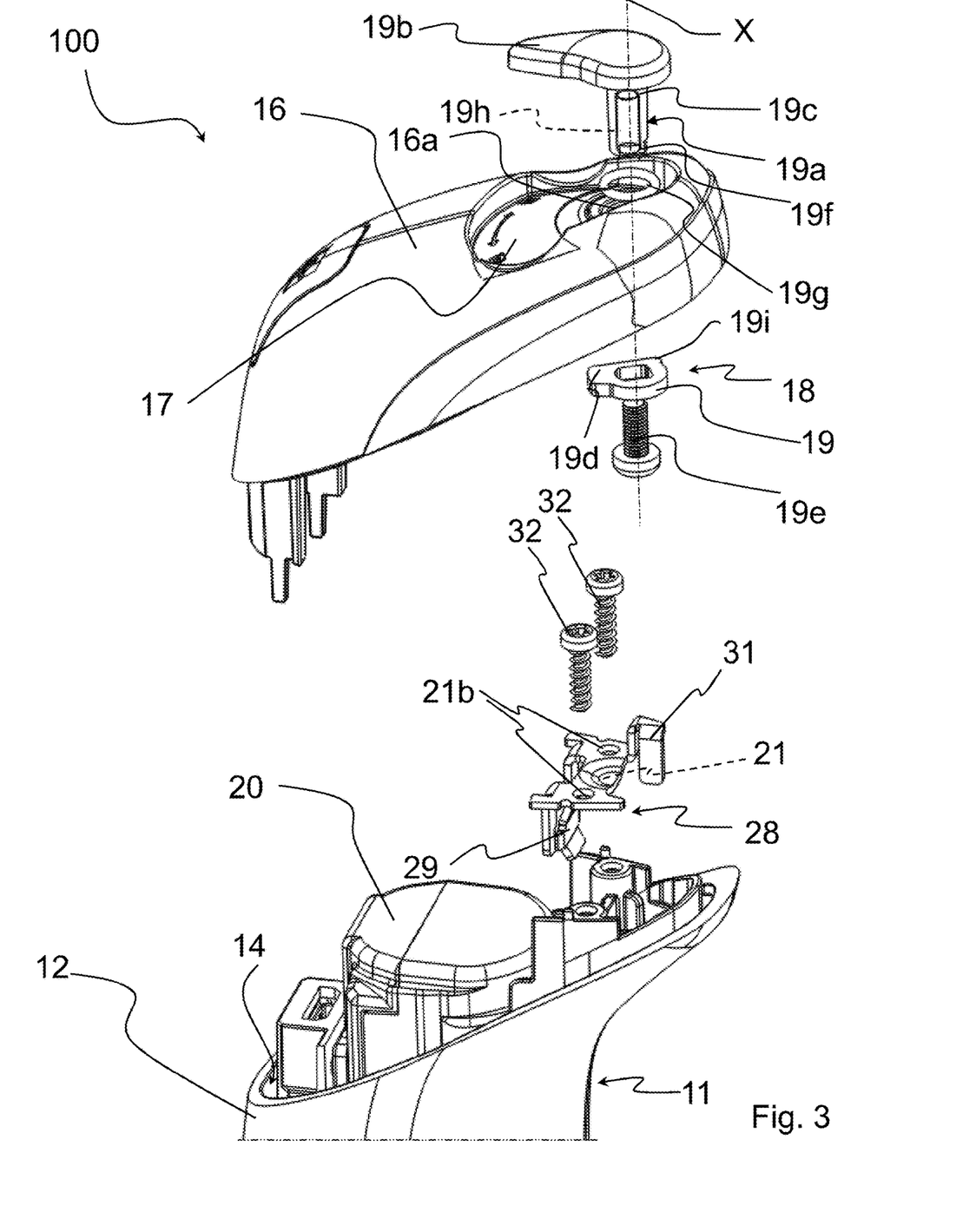
FIG. 3 is an exploded schematic perspective view of a portion of a portable terminal in accordance with the present invention.

FIGS. 1 and 2 show a portion of a portable terminal 10 of the prior art. This terminal comprises a compartment 14 configured to house a battery pack 20 and a cap 16 configured to close the compartment 14. The compartment 14 is formed in the handle 12 of the portable terminal 10. The closing/opening of the cap 16 takes place through a suitable locking/unlocking device 18 that typically comprises a first hooking element 19 associated with the cap 16 and a second hooking element (not visible) associated with the handle 12 of the terminal at the compartment 14. The first hooking element 19 is movable, in this specific case through a screwdriver, between an engagement position with the second hooking element, so as to close the compartment 14, and a disengagement position from the second hooking element, so as to open the cap 16 and allow the insertion/extraction of the battery pack 20 into/from the compartment 14. As illustrated in FIG. 2, when the cap 16 is open, particularly if the portable terminal 10 is oriented with the compartment 14 facing downwards, the battery pack 20 can accidentally come out from the compartment 14 by gravity and fall.

Portable terminals are known that are provided, as well as with a locking/unlocking device for locking/unlocking the cap to/from the case of the portable terminal, with a device configured to hold the battery pack in the respective compartment. The holding device can be deactivated by a user when the cap is open.

U.S. Pat. No. 6,730,432 discloses a portable terminal in which the cap locking/unlocking device comprises a pair of pins rotatably mounted on the cap and intended to couple with respective abutment elements provided in respective seats formed in the case of the portable terminal. Such a terminal also comprises a holding device for holding the battery pack. Such a holding device comprises a pair of appendages formed on the battery pack that engage with a pair of respective undercuts formed at the compartment which houses the battery pack.

U.S. Pat. No. 9,244,507 discloses a portable terminal in which the cap locking/unlocking device comprises a pair of elements rotatably mounted on the case and intended to couple with respective abutment surfaces provided on the cap. Such a terminal also comprises a holding device for holding the battery pack. Such a holding device comprises a release button having a movable main body arranged below the battery pack.

The Applicant observed that in the solutions described above the devices for locking/unlocking the cap are made through elements and components distinct from those of the holding devices for holding the battery pack in position.

The Applicant addressed the problem of providing a portable terminal comprising a locking/unlocking device and a holding device for holding the battery pack that are constructively simpler than those of the prior art documents described above.

SUMMARY

The present invention therefore relates to a portable terminal comprising a case and, inside said case:—an electronic and/or optoelectronic module configured to acquire and/or process information and/or data;
a compartment configured to house a battery pack, said battery pack being configured to power said electronic and/or optoelectronic module;
wherein said portable terminal further comprises:
a cap configured to close said compartment, said cap being movable between a closure position wherein said compartment is closed and an opening position wherein said compartment is open in order to allow said battery pack to be inserted into and extracted from said compartment;
a locking/unlocking device configured to lock/unlock said cap to/from said case, said locking/unlocking device comprising a first hooking element associated with said cap and a second hooking element associated with said case at said compartment, wherein said first hooking element is movable between an engagement position wherein said second hooking element is engaged to said second hooking element and a disengagement position wherein said second hooking element is disengaged from said second hooking element;
a holding device configured to hold said battery pack within said compartment, wherein said holding device can be deactivated when said cap is in said opening position in order to allow said battery pack to be extracted from said compartment;
characterised in that said holding device is associated with said second hooking element.

Advantageously, the provision of a holding device associated with the second hooking element allows the manufacturing and assembly operations of the portable terminal to be simplified.

Preferably, said holding device is made in a single piece with said second hooking element.

Advantageously, such a single piece can be made easily and cost-effectively using known technology like for example injection moulding.

Preferably, said holding device comprises a first elastic element which exerts a thrust against said battery pack.

Preferably, said second hooking element comprises a substantially planar hooking surface and said first elastic element extends at least partially along a direction which is tilted with respect to said hooking surface.

Preferably, said first elastic element is movable between an operative position wherein it holds said battery pack in said compartment and a rest position when said battery pack is extracted from said compartment.

In a preferred embodiment of the present invention, said first elastic element comprises a first portion which extends along a direction tilted with respect to said hooking surface and configured to contact said battery pack when said battery pack is fully inserted into said compartment.

In a preferred embodiment of the present invention, said first hooking element rotates integrally with a pin which rotates about a predetermined rotation axis and passes through a through hole formed in said cap, an actuation lever configured to put said pin in rotation being fixedly associated with a free end portion of said pin arranged on the opposite side to said first hooking element with respect to said cap.

Preferably, the portable terminal according to the present invention comprises a compression spring arranged between said actuation lever and said cap and housed in a respective seat formed on said cap at said through hole.

Advantageously, such a compression spring compensates for dimensional differences (with respect to the design dimensions, due to the machining tolerances) of the components associated with the first hooking element, as well as possible deformations caused by vibrations or impacts to the portable terminal.

Preferably, said second hooking element comprises a second elastic element which act on said first hooking element.

Advantageously, the second elastic element keeps the first hooking element in the correct position in the case of vibrations or impacts to the portable terminal.

Preferably, the portable terminal according to the present invention is of the Handheld type.

BRIEF DESCRIPTION OF THE DRAWINGS

Further characteristics and advantages of the portable terminal of the present invention will become clearer from the following detailed description of a preferred embodiment thereof, given with reference to the attached drawings purely as an example and not for limiting purposes. In such drawings.

DETAILED DESCRIPTION

The attached FIGS. 1 and 2 show a portable terminal 10 of the prior art, which has been briefly described above.

In the remaining attached FIGS. 3, 4, 5, 5a, 6, 6a, 7 and 8, reference numeral 100 indicates a portable terminal in accordance with the present invention. In the non-limiting example of such figures, the portable terminal is an optical code reader of the Handheld type.

The portable terminal 100 comprises a case 11 and, inside the case 11, an electronic and/or optoelectronic module configured to acquire and/or process information and/or data (not illustrated).

The portable terminal 100 comprises a compartment 14 configured to house a battery pack 20 adapted to power the electronic and/or optoelectronic module.

The battery pack 20 preferably comprises, at a free end portion thereof, a projecting portion 20a. In particular, the projecting portion 20a projects laterally with respect to a main body 20b of the battery pack 20.

In the embodiment illustrated herein, the compartment 14 is at least partially formed in a handle 12 of the portable terminal 100.

Figure 5:
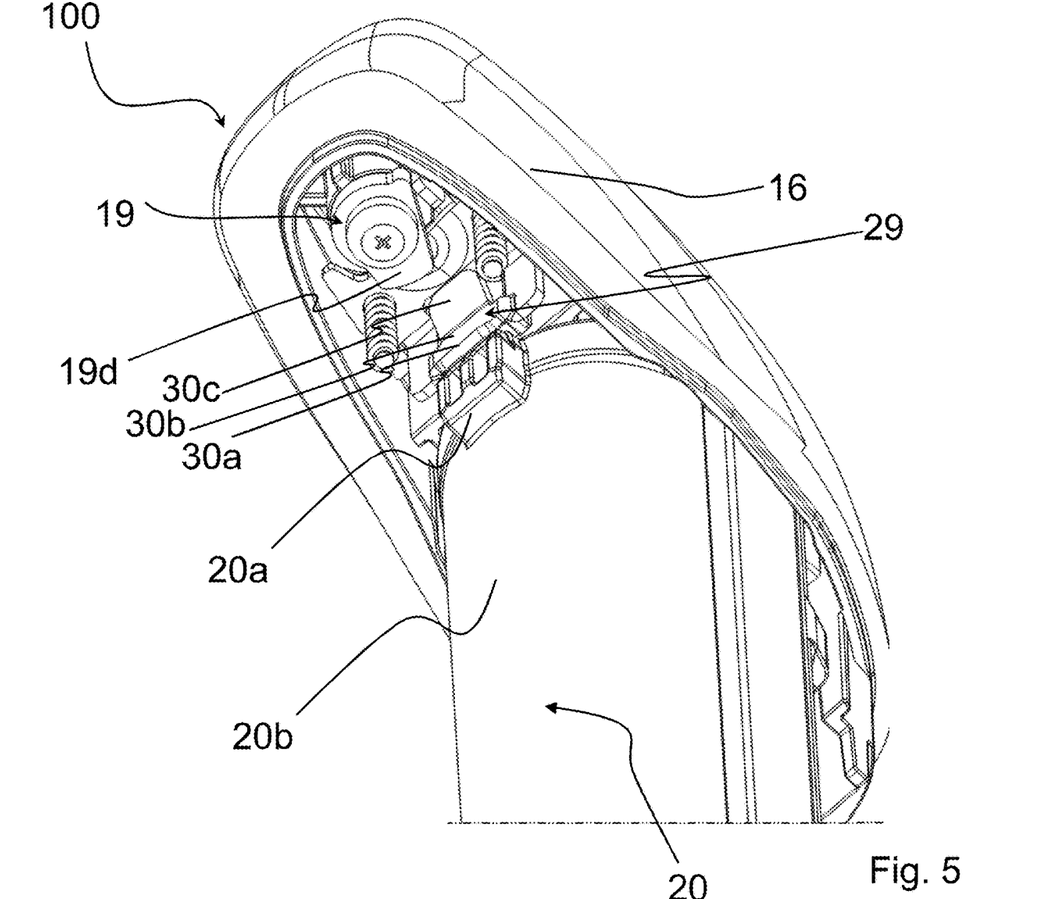
FIG. 5 is a schematic perspective view of the portion of portable terminal of FIG. 3, wherein a cap of the portable terminal is in a closure position thereof.

The portable terminal 100 comprises a cap 16 configured to close the compartment 14. The cap 16 is movable between a closure position of the compartment 14 (FIGS. 5, 5a and 7) and an opening position of the compartment 14 (FIGS. 6, 6a and 8). The cap 16 is taken into the opening position to allow the insertion/extraction of the battery pack 20 into/from the compartment 14.

The portable terminal 100 further comprises a locking/unlocking device 18 configured to lock/unlock the cap 16 to/from the aforementioned case 11.

The locking/unlocking device 18 comprises a first hooking element 19 associated with the cap 16 and a second hooking element 21 associated with the case 11 at the compartment 14.

The first hooking element 19 is movable between an engagement position wherein it is engaged with the second hooking element 21 (FIGS. 5, 5a and 7), so as to close the compartment 14 with the cap 16, and a disengagement position wherein it is disengaged from the second hooking element 21 (FIGS. 6, 6a and 8), so as to open the cap 16 and allow the insertion/extraction of the battery pack 20 into/from the compartment 14.

In particular, the first hooking element 19 rotates integrally with a pin 19a which rotates about a predetermined rotation axis X and passes through a through hole 16a formed in the cap 16.

An actuation lever 19b configured to put the pin 19a in rotation is integral with a free end portion 19c of the pin 19a arranged on the opposite side to the first hooking element 19 with respect to the cap 16. Preferably, the lever 19b is made in a single piece with the pin 19a.

The actuation lever 19b is at least partially housed in a compartment 17 formed on the outer surface of the cap 16. Preferably, the actuation lever 19b is completely housed in the compartment 17, so as not to project with respect to the total bulk of the cap 16.

In the non-limiting example of FIGS. 3-8, the first hooking element 19 is a shaped washer comprising a radially projecting portion 19d that, upon rotating the pin 19a, engages/disengages with/from the second hooking element 21 (FIGS. 5, 7 and 6, 8 respectively).

Preferably, the overall rotation stroke of the pin 19a is comprised between 20° and 90°, the extreme values being included, for example it is equal to about 40°. However, variants are provided in which the overall rotation stroke can reach 180°.

In the non-limiting example of FIGS. 3-8, the second hooking element 21 comprises a substantially planar hooking surface 21a (FIG. 6).

The shaped washer 19 is fixed through a screw 19e to an end portion 19f of the pin 19a arranged on the opposite side to the lever 19b. The screw 19e is screwed into a threaded longitudinal cavity 19h of the pin 19a which extends coaxially to the rotation axis X.

Figure 4:
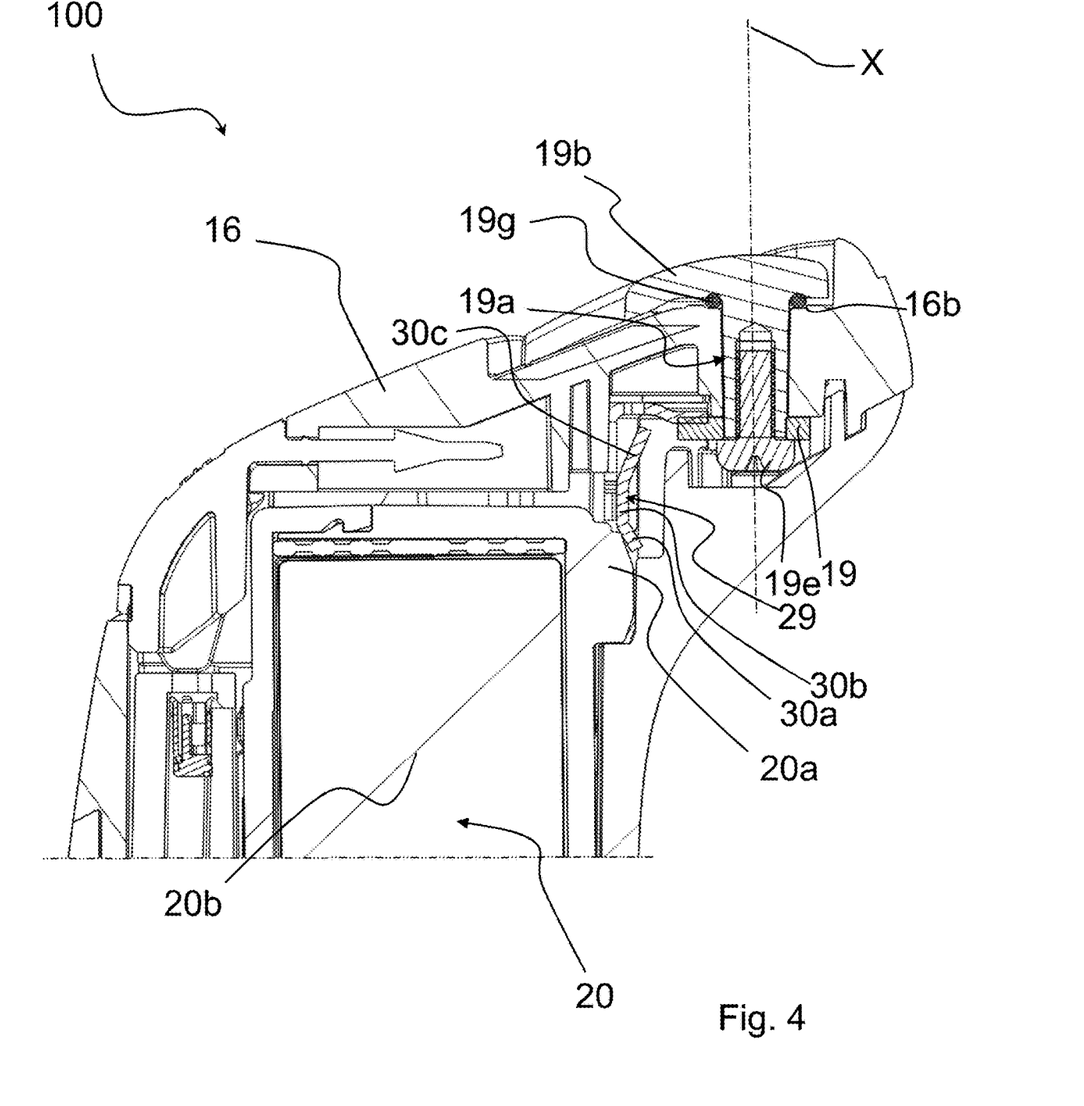
FIG. 4 is a schematic longitudinal section view of the portion of portable terminal of FIG. 3.

A compression spring 19g is arranged between the lever 19b and the cap 16. The compression spring 19g is housed in a respective seat 16b formed on the cap 16 at the through hole 16a (FIG. 4).

The portable terminal 100 comprises a holding device 28 configured to hold the battery pack 20 in the compartment 14.

The holding device 28 can be deactivated when the cap 16 is in the opening position, so that the battery pack 20 can be extracted from the compartment 14.

In accordance with the present invention, the holding device 28 is associated with the second hooking element 21.

In the non-limiting example of FIGS. 3-8, the holding device 28 is made in a single piece with the second hooking element 21. Such a piece can be made of plastic material, for example through injection moulding.

The second hooking element 21 comprises a first elastic element 29 which exerts a thrust on the battery pack 20.

Figure 7:
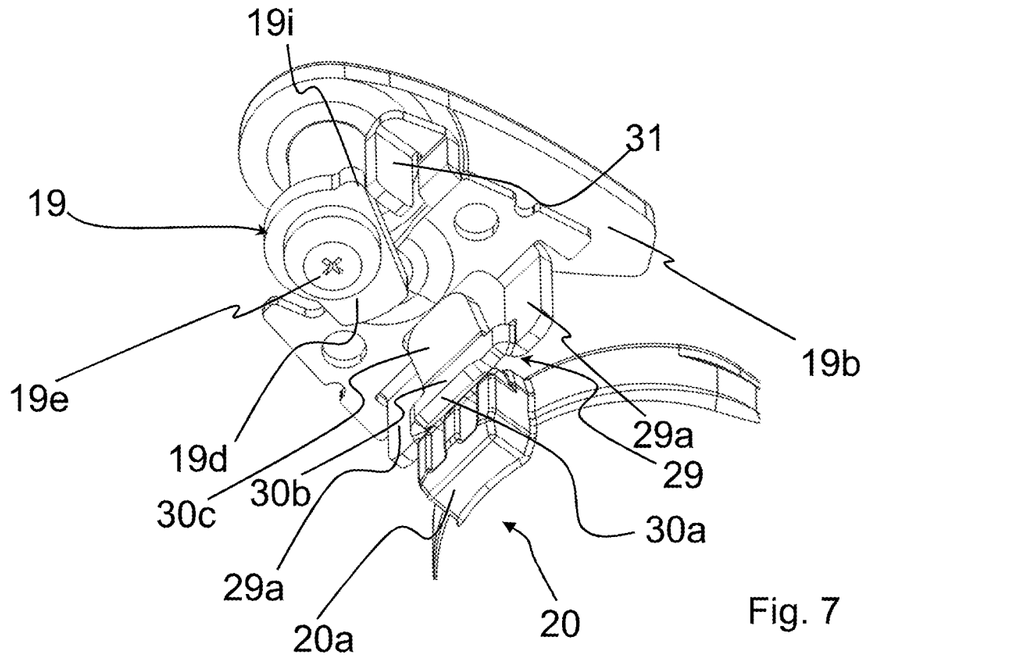
FIG. 7 is a schematic perspective view of a part of the portion of portable terminal of FIG. 3, wherein the cap illustrated in FIG. 5 is in the closure position thereof.
Figure 8:
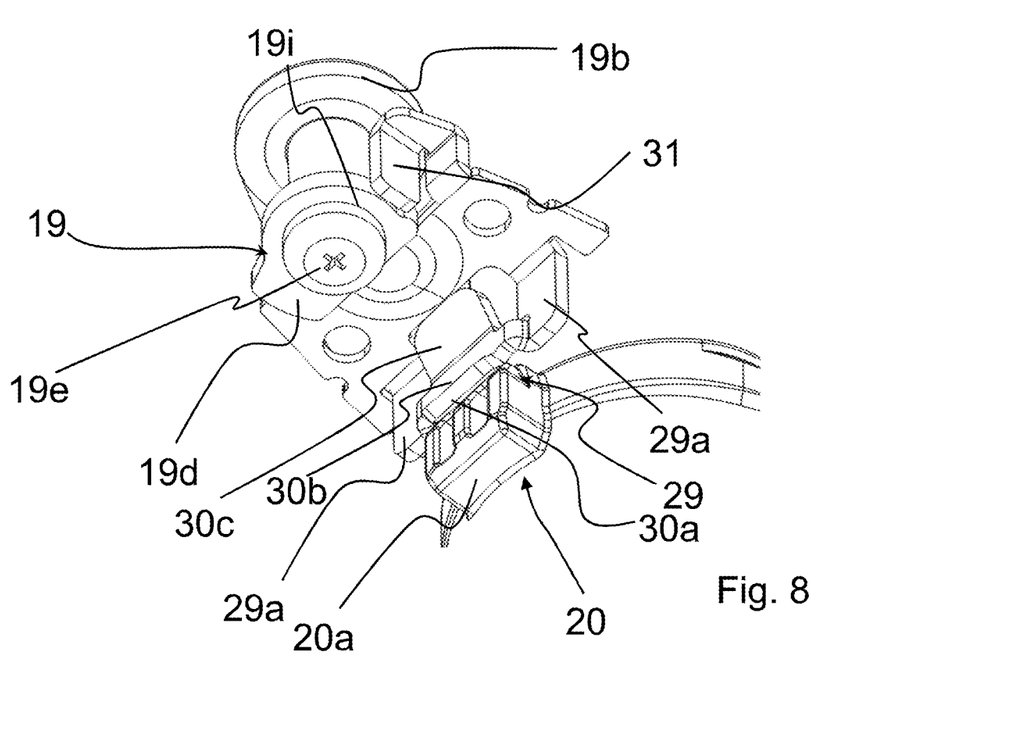
FIG. 8 is a schematic perspective view of the part of the portion of portable terminal of FIG. 7, wherein the cap illustrated in FIG. 6 is in the opening position thereof.

As illustrated in FIGS. 7 and 8, the first elastic element 29 comprises a pair of fins 29a arranged side-by-side. The fins 29a extend along a direction substantially perpendicular to the hooking surface 21a.

The first elastic element 29 comprises a first portion 30a that extends along a direction tilted with respect to the hooking surface 21a, a second portion 30b that extends along a direction substantially perpendicular to the hooking surface 21a and a third portion 30c that extends on the opposite side to the first portion 30a with respect to the second portion 30b and tilted with respect to the second portion 30b on the same side as the first portion 30a.

In the example illustrated herein, the first portion 30a is arranged between the fins 29a and is fixedly associated with, preferably made in a single piece with, the fins 29a.

The first elastic element 29 is movable between a first operative position in which it holds the battery pack 20 in the compartment 14 (FIG. 4) and at least one second operative position in which the battery pack 20 can be extracted from the compartment 14. Once extraction has taken place, the first elastic element 29 goes into a rest position different from the aforementioned first and second operative positions.

In the example illustrated herein, in order to extract the battery pack 20 from the compartment 14, the user pulls the battery pack 20 out of the compartment 14 starting from the condition illustrated in FIG. 4. The projecting portion 20a of the battery pack 20 slides firstly on the first portion 30a of the first elastic element 29, then on the second portion 30b of the first elastic element 29 and finally on the third portion 30c of the first elastic element 29. The latter is then progressively moved from the first operative position illustrated in FIG. 4 to different second operative positions during the sliding of the battery pack 20 in the compartment 14. Once extraction has taken place, the first elastic element 29 goes into a rest position different from the aforementioned first and second operative positions.

In order to insert the battery pack 20 into the compartment 14, the user pushes the battery pack 20 inside the compartment 14 until the projecting portion 20a of the battery pack 20 comes into contact with the third portion 30c of the first elastic element 29. A further push of the battery pack 20 inside the compartment 14 makes the projecting portion 20a of the battery pack 20 slide firstly on the third portion 30c of the first elastic element 29, then on the second portion 30b of the first elastic element 29 and finally on the first portion 30a of the first elastic element 29, until the condition illustrated in FIG. 4 is reached. The first elastic element 29 is thus progressively moved from its rest position to different second operative positions during the sliding of the battery pack 20 inside the compartment 14, until the first operative position illustrated in FIG. 4 is reached. Once insertion is complete, the first elastic element 29 goes into an operative position in which the first portion 30a thereof exerts a thrust on the projecting portion 20a of the battery pack 20, holding the battery pack 20 in position inside the compartment 14.

In an alternative embodiment that is not illustrated, the movement of the first elastic element 29 from the position of FIG. 4 to the position which allows the extraction of the battery pack 20 from the compartment 14 is carried out manually by a user.

In the non-limiting example of FIGS. 3-8, the second hooking element 21 is fixed to the case 11 at the compartment 14 through a pair of screws 32.

The pair of screws 32 passes through respective through holes 21b formed in the second hooking element 21 at the hooking surface 21a.

Figure 5A:
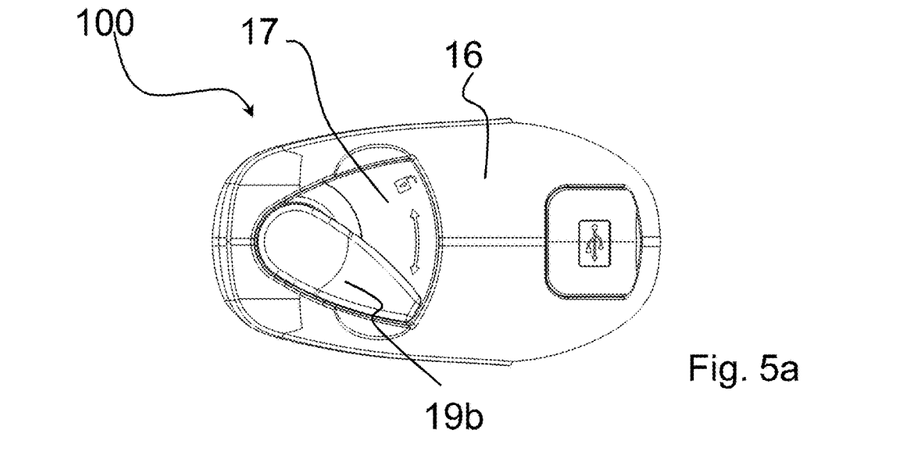
FIG. 5*a* is a plan view of the portion of portable terminal of FIG. 5.
Figure 6:
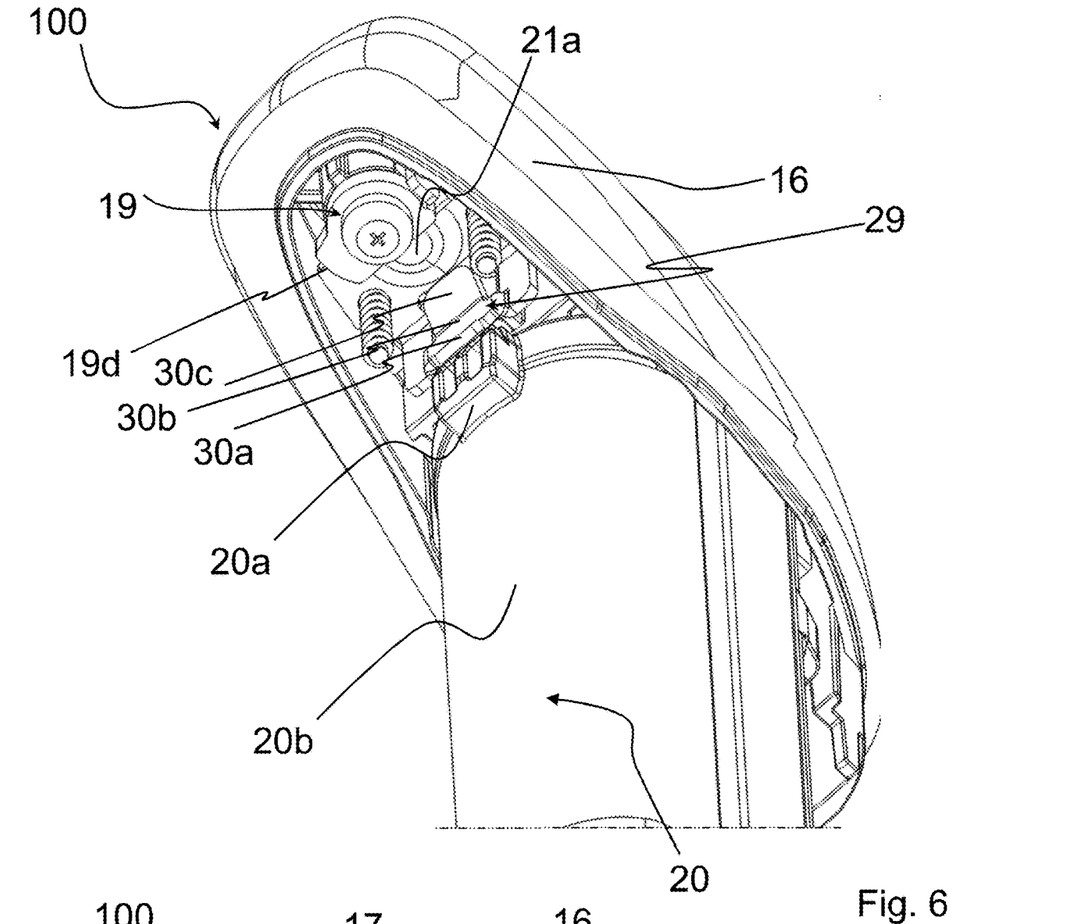
FIG. 6 is a schematic perspective view of the portion of portable terminal of FIG. 3, wherein a cap of the portable terminal is in an opening position thereof.
Figure 6A:
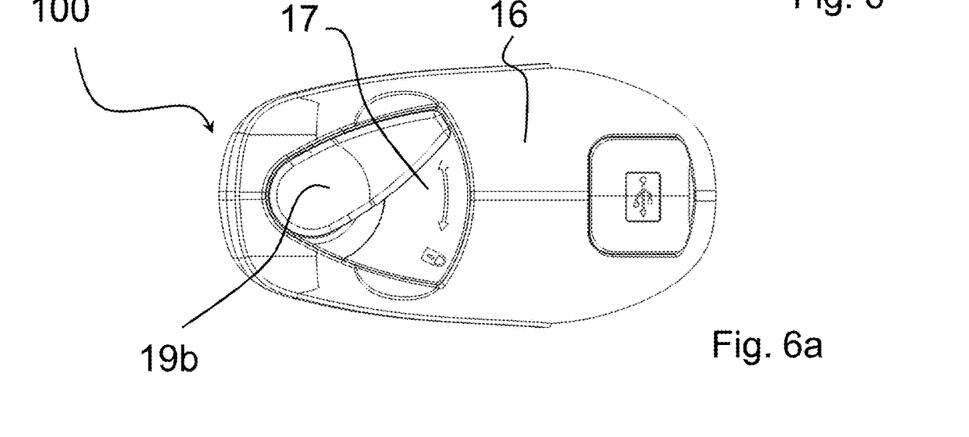
FIG. 6*a* is a plan view of the portion of the portable terminal of FIG. 6.

The second hooking element 21 also comprises a second elastic element 31 which acts in abutment against the first hooking element 19 so as to hold it in the respective positions when the lever 19b is in the positions of FIGS. 5a and 6a.

With reference to FIGS. 7 and 8, the first hooking element 19 comprises, in addition to the radially projecting portion 19d, a further radially projecting portion 19i.

The second elastic element 31 comprises a substantially flat surface extending along a direction substantially perpendicular to the hooking surface 21a.

When the first hooking element 19 is in the position where it is engaged with the second hooking element 21 (FIGS. 5, 5a and 7), so as to close the compartment 14 with the cap 16, the second elastic element 31 is arranged on one side with respect to the further radially projecting portion 19i of the first hooking element 19 and in abutment against a side portion of said radially projecting portion 19i, whereas when the first hooking element 19 is in the position where it is disengaged from the second hooking element 21 (FIGS. 6, 6a and 8), so as to open the cap 16 and allow the insertion/extraction of the battery pack 20 into/from the compartment 14, the second elastic element 31 is arranged on the other side with respect to the further radially projecting portion 19i of the first hooking element 19 and in abutment against an opposite side portion of said further radially projecting portion 19i.

In both the positions described above, the second elastic element 31 opposes the movement of the first hooking element 19 from the position of FIGS. 5 and 7 to the position of FIGS. 6 and 8 and vice-versa. In order to pass from one of these two positions to the other it is necessary for the user to exert a sufficient force on the actuation lever 19b to overcome the elastic resistance offered by the second elastic element 31. During the passage from the position of FIGS. 5 and 7 to the position of FIGS. 6 and 8 and vice-versa, the second elastic element 31 is progressively pushed by the further radially projecting portion 19i of the first hooking element 19 away from the first hooking element 19 to go back into the position of FIGS. 5 and 7 or of FIGS. 6 and 8 as soon as the further radially projecting portion 19i of the first hooking element 19 overcomes the second elastic element 31.

Of course, those skilled in the art can bring further modifications and variants to the invention described above in order to satisfy specific and contingent application requirements, said variants and modifications in any case falling within the scope of protection as defined by the following claims.

What is claimed is:

1. A portable terminal, comprising a case and, further comprising inside the case:
   at least one of an electronic module or an optoelectronic module configured to do at least one of acquire or process information, data, or a combination thereof;
   a compartment configured to releasably house a battery pack in a manner that enables the battery pack to be slidably inserted into and slidably removed from the compartment, the battery pack being configured to power the electronic module or the optoelectronic module when slidably inserted fully into the compartment;
   a cap configured to close the compartment, the cap being movable between a closure position wherein the compartment is closed by the cap and an opening position wherein the compartment is open in order to allow the battery pack to be slidably inserted into and slidably removed from the compartment;
   a locking/unlocking device configured to lock/unlock the cap to/from the case, the locking/unlocking device comprising a first hooking element associated with the cap and a second hooking element associated with the case at the compartment, the first hooking element being movable, under control of an actuation lever carried on an outer surface of the cap, between an engagement position wherein the first hooking element engages with the second hooking element and a disengagement position wherein the first hooking element is disengaged from the second hooking element; and
   a holding device comprising a first elastic element configured to exert thrust against a projection extending from a main body of the battery pack to provide resistance against the battery pack being slidably removed from the compartment, wherein slidably removing the battery pack from within the compartment causes the projection to sequentially engage each of multiple portions of the holding device, and wherein the holding device is associated with the second hooking element.

2. The portable terminal according to claim 1, wherein the holding device is made in a single piece with the second hooking element.

3. The portable terminal according to claim 1, wherein the first elastic element is movable between an operative position wherein it holds the battery pack within the compartment and a rest position when the battery pack is extracted from the compartment.

4. The portable terminal according to claim 1, wherein the second hooking element comprises a substantially planar hooking surface and wherein the first hooking element extends at least partially along a direction which is tilted with respect to the hooking surface.

5. The portable terminal according to claim 4, wherein the first elastic element is movable between an operative position wherein it holds the battery pack within the compartment and a rest position when the battery pack is extracted from the compartment.

6. The portable terminal according to claim 4, wherein the first elastic element comprises a first portion which extends along a direction tilted with respect to the hooking surface and is configured to contact the battery pack when the battery pack is fully inserted into the compartment.

7. The portable terminal according to claim 1, wherein:
the first hooking element rotates integrally with a pin;
the pin rotates about a predetermined rotation axis (X), and passes through a through hole formed in the cap;
the actuation lever is configured to rotate the pin, being fixedly associated with a free end portion of the pin; and
the free end portion and the first hooking element are positioned adjacent opposite sides of the cap.

8. The portable terminal according to claim 7, comprising a compression spring arranged between the actuation lever and the cap, and housed in a respective seat formed on the cap at the through hole.

9. The portable terminal according to claim 1, wherein the second hooking element comprises a second elastic element which acts on the first hooking element.

10. The portable terminal according to claim 1, wherein the terminal is of the Handheld type.

11. The portable terminal according to claim 1, wherein the terminal is selected from the group consisting of an optical code reader, a handheld computer, a laptop computer, a personal digital assistant (PDA), a tablet computer, a mobile telephone, and a portable measuring device.

12. The portable terminal according to claim 1, wherein the compartment is formed at least partially in a handle of the portable terminal.

13. The portable terminal according to claim 7, wherein the first hooking element includes a radially projecting portion that, upon rotating the pin, engages with the second hooking element or disengages from the second hooking element.

14. The portable terminal according to claim 13, wherein the first hooking element includes a shaped washer including the radially projecting portion.

15. The portable terminal according to claim 7, wherein the pin is rotatable according to a rotation stroke that is between about 20 degrees and about 90 degrees.

16. The portable terminal according to claim 1, wherein the second hooking element comprises a substantially planar hooking surface, and wherein the first elastic element comprises a pair of fins arranged side by side that extend along a direction substantially perpendicular to the hooking surface.

17. The portable terminal according to claim 16, wherein the first elastic element comprises the multiple portions of the holding device that are sequentially engaged when the battery pack is slidably inserted into and slidably removed from the compartment, the multiple portions of the holding device comprising:
a first portion extending along a direction tilted with respect to the hooking surface;
a second portion extending along a direction substantially perpendicular to the hooking surface; and
a third portion that extends on the opposite side to the first portion with respect to the second portion and tilted with respect to the second portion on the same side as the first portion.

18. The portable terminal according to claim 17, wherein the first portion is arranged between the fins and in a fixed association with the fins.

19. The portable terminal according to claim 9, wherein:
when the first hooking element is engaged with the second hooking element, the second elastic element is arranged on one side with respect a radially projecting portion of the first hooking element and in abutment against a side portion of the radially projecting portion; and
when the first hooking element is disengaged from the second hooking element, the second elastic element is arranged on the other side with respect to the radially projecting portion of the first hooking element and in abutment against an opposite side portion of the radially projecting portion.

20. The portable terminal according to claim 1, wherein the first elastic element is configured to exert thrust against the projection extending from the main body of the battery pack to provide resistance against the battery pack being slidably inserted fully into the compartment, wherein slidably inserting the battery pack fully into the compartment causes the projection extending from the main body of the battery pack to sequentially engage each of the multiple portions of the holding device in a sequential order that reverses a sequential order in which each of the multiple portions of the holding device are sequentially engaged when the battery pack is slidably removed from the compartment.

\* \* \* \* \*